United States Patent
Tekie et al.

(10) Patent No.: US 7,695,701 B2
(45) Date of Patent: Apr. 13, 2010

(54) PROCESS FOR TREATING ACID GAS IN STAGED FURNACES WITH INTER-STAGE HEAT RECOVERY

(76) Inventors: Zeru Berhane Tekie, 21 Norwegian Wood Dr., Newark, DE (US) 19702; Luis Alberto Chu, 1642 Flint Hill Rd., Landenberg, PA (US) 19350; Eugene F. Hartstein, 9 Verbena Dr., Newark, DE (US) 19711

( * ) Notice: Subject to any disclaimer, the term of this patent is extended or adjusted under 35 U.S.C. 154(b) by 0 days.

(21) Appl. No.: 12/074,988

(22) Filed: Mar. 7, 2008

(65) Prior Publication Data
US 2009/0226353 A1 Sep. 10, 2009

(51) Int. Cl.
C01B 17/50 (2006.01)
C01B 31/20 (2006.01)

(52) U.S. Cl. .......................... 423/224; 423/222
(58) Field of Classification Search ................ 423/220, 423/224, 573.1, 574.1, 576.8
See application file for complete search history.

(56) References Cited

U.S. PATENT DOCUMENTS

| | | | | |
|---|---|---|---|---|
| 3,542,511 A | * | 11/1970 | Shah | 423/243.12 |
| 3,617,212 A | * | 11/1971 | Shah | 423/522 |
| 3,720,625 A | * | 3/1973 | Kapp et al. | 252/377 |
| 4,176,787 A | | 12/1979 | Gary | |
| 4,225,332 A | | 9/1980 | Tsay | |
| 4,267,884 A | | 5/1981 | Gary | |
| 4,572,281 A | | 2/1986 | Müllner et al. | |
| 4,788,918 A | | 12/1988 | Keller | |
| 4,826,670 A | * | 5/1989 | Hegarty | 423/574.1 |
| 4,870,910 A | | 10/1989 | Wright et al. | |
| 5,086,715 A | | 2/1992 | Bürgin et al. | |
| 5,486,345 A | * | 1/1996 | Watson | 423/573.1 |
| 5,628,977 A | * | 5/1997 | Heisel et al. | 423/573.1 |
| 5,702,678 A | * | 12/1997 | Cieutat et al. | 423/567.1 |
| 6,223,557 B1 | | 5/2001 | Cole | |
| 6,510,706 B2 | | 1/2003 | Stone et al. | |
| 6,846,965 B1 | | 1/2005 | Schulz et al. | |

(Continued)

FOREIGN PATENT DOCUMENTS

CN 1566751 1/2005

(Continued)

OTHER PUBLICATIONS

Gimenez, Heat recovery in pyrite roasting; Genie Chimique (1963), 89(4), 111-117. Abstract.

(Continued)

*Primary Examiner*—Roy King
*Assistant Examiner*—Jared Wood (57) ABSTRACT

A process for treating acid gas comprising hydrogen sulfide comprises introducing a first acid gas into a reducing furnace to produce a first oxidized gas stream, cooling the first oxidized gas stream in a first heat recovery system, introducing the cooled gas stream into an oxidizing furnace to produce a second oxidized gas stream and cooling the second oxidized gas stream in a second heat recovery system. The acid gas is preferably produced in a refinery after treatment of sour gas or sour water. Spent acid may be fed into oxidizing furnace as part of a sulfuric acid recovery process. The spent acid can be spent sulfuric acid from a sulfuric acid alkylation process.

21 Claims, 1 Drawing Sheet

U.S. PATENT DOCUMENTS

| | | | |
|---|---|---|---|
| 6,925,837 | B2 | 8/2005 | Eaton |
| 6,986,802 | B2 | 1/2006 | Colling et al. |
| 2004/0096381 | A1* | 5/2004 | Watson et al. ............... 423/224 |

FOREIGN PATENT DOCUMENTS

| | | |
|---|---|---|
| DE | 3730365 | 3/1989 |
| DE | 4038570 | 6/1992 |
| EP | 1 437 548 A1 | 7/2004 |
| EP | 1 647 771 A1 | 4/2006 |
| GB | 1 483 166 | 8/1977 |
| GB | 1 503 943 | 3/1978 |
| JP | 60096825 | 5/1985 |
| JP | 61228088 | 10/1986 |
| JP | 62032174 | 2/1987 |
| JP | 2003002870 A | 1/2003 |
| KR | 2003054318 | 7/2003 |
| SU | 1672107 | 8/1991 |

OTHER PUBLICATIONS

Bolek, A comparison of the HRSR system with state-of-the-art boilers; Engineering Aspects of Magnetohydrodynamics (1983), 21$^{st}$, E, 13 pp.; Babcock and Wilcox Co., Barberton, Ohio, USA. Abstract.

Shelton, Comparison of $NO_x$ reduction technologies for industrial applications; Presented at: Conference on selective catalytic & non-catalytic reduction for $NO_x$ control; Dept. of Energy. Pittsburgh Energy Technology Center, Pittsburgh, Pennsylvania, USA. Abstract.

Müller, Sulfur Dioxide; Lurgi Metallurgie GmbH, Frantfurt/Main, Federal Republic of Germany; 2005 Wiley-VCH Verlag GmbH & Co.

The Challenge: Understanding and Predicting Process Behavior; Aspen Plus® presentation; May 15-19, 2006, Frankfurt an Main, Germany; © Aspen Technology, Inc.

\* cited by examiner

PROCESS FOR TREATING ACID GAS IN STAGED FURNACES WITH INTER-STAGE HEAT RECOVERY

FIELD OF THE INVENTION

The present invention relates to a process for treating an acid gas, more particularly to a process for treating an acid gas comprising hydrogen sulfide.

BACKGROUND OF THE INVENTION

Petroleum refineries employ many different processes which convert crude oil into hundreds of products. A number of these processes produce sulfur-containing process streams which can be treated to regenerate active ingredients or to recover sulfur values from such streams. Sulfur-containing process streams are generated in hydrotreating processes and sulfuric acid-catalyzed alkylation. Hydrotreating includes hydrocracking and removal of undesirable components, such as sulfur and nitrogen, by distillation and/or hydrodesulfurization or hydrodenitrogenation.

Hydrotreating may generate sour gas streams, which contain valuable hydrocarbons and are rich in acid gas components (e.g., $H_2S$ and $CO_2$). By "sour" gas streams it is meant herein to describe a stream which comprises an acid gas, typically $H_2S$. The acid gas components must be removed to "sweeten" the sour gas stream so that the sweetened stream can be sold or used as fuel gas for the refinery's energy needs. The acid gas components must be further treated to comply with environmental regulations.

It is recognized that sour gas streams are not only generated in petroleum refining, but are also generated in natural gas processing and gasification of coal or petroleum coke.

Acid gas generated from refinery and other processes may be treated in either a sulfur recovery unit (SRU), which produces elemental sulfur, or spent acid recovery (SAR) plant, which produces purified sulfuric acid.

In SAR plants with conventional furnaces, acid gases may be directly fed to a spent acid decomposition furnace to serve as fuel source. If the acid gas provides insufficient energy for the amount of spent sulfuric acid to be decomposed, additional fuel, such as natural gas, refinery fuel gas, or other energy source is required. Added fuel is a cost to the plant. If there is excess acid gas relative to the amount of spent acid to be decomposed, too much heat is generated and quench water is added for temperature control. Most of this heat is not recoverable. Added quench water also increases the volume of gas treated downstream, and hence increases equipment size and cost.

Under oxidizing conditions (high temperature and excess oxygen), ammonia-containing acid gases contribute to fuel $NO_x$ formation. Thus, a conventional furnace has deficiencies that include adding quench water, wasted heat and higher $NO_x$ formation.

It is desirable to improve conventional processes for treating acid gases to improve heat recovery, minimize capital investment, minimize need for added fuel, and reduce $NO_x$ formation. The present invention meets these objectives.

SUMMARY OF THE INVENTION

The present invention is directed to a process for treating an acid gas comprising hydrogen sulfide. The process comprises: (a) introducing a first acid gas, which comprises hydrogen sulfide, a first oxygen-containing gas, and optionally a supplemental fuel, into a reducing furnace, producing a first oxidized gas stream; (b) introducing the first oxidized gas stream into a first heat recovery system wherein the first oxidized gas stream is cooled and heat is recovered therefrom; (c) introducing the cooled first oxidized gas stream, a second oxygen-containing gas, and optionally one or more of (i) a supplemental fuel, which can be a second acid gas which comprises hydrogen sulfide; (ii) spent acid and (iii) water, into an oxidizing furnace, producing a second oxidized gas stream; and (d) introducing the second oxidized gas stream into a second heat recovery system; wherein the second oxidized gas stream is cooled and heat is recovered therefrom.

The acid gas of step (a) can be derived from one or more refinery process streams, which comprise hydrogen sulfide.

A preferred embodiment the process of this invention is a combustion process in a spent acid recovery plant comprising: (a) introducing a first acid gas, which comprises hydrogen sulfide, and a first oxygen-containing gas into a reducing furnace, producing a first oxidized gas stream; (b) introducing the first oxidized gas stream into a first heat recovery system wherein the first oxidized gas stream is cooled and heat is recovered therefrom; (c) introducing the cooled first oxidized gas stream, a second oxygen-containing gas, spent acid comprising sulfuric acid, and optionally one or both of (i) a supplemental fuel, which can be a second acid gas, which comprises hydrogen sulfide; and (ii) water, into an oxidizing furnace, producing a second oxidized gas stream; (d) introducing the second oxidized gas stream into a second heat recovery system; wherein the second oxidized gas stream is cooled and heat is recovered therefrom; and (e) treating the cooled second oxidized gas stream in a spent acid recovery plant to produce sulfuric acid. Preferably, the first acid gas comprises solvent-treated gas and sour water stripper gas. Preferably a supplemental fuel which is an ammonia-free acid gas, such as solvent-treated acid gas is introduced into the oxidizing furnace.

DETAILED DESCRIPTION

Trade names are capitalized herein.

The present invention comprises the use of staged furnaces, with inter-stage heat recovery, for treating an acid gas, for example, in sulfuric acid regeneration plants and sulfur recovery units. This invention improves heat recovery, minimizes capital investment, and decreases $NO_x$ generation compared to the conventional single stage furnace used for burning acid gas as a fuel source and for spent acid decomposition.

The process of this invention comprises introducing a first acid gas comprising hydrogen sulfide and a first oxygen-containing gas into a reducing furnace to produce a first oxidized gas stream; introducing the first oxidized gas stream into a first heat recovery system wherein the first oxidized gas stream is cooled and heat is recovered therefrom; introducing the cooled first oxidized gas stream, and a second oxygen-containing gas, and optionally one or more of (i) a second supplemental fuel, which can be an ammonia-free second acid gas; (ii) spent acid and (iii) water, into an oxidizing furnace, producing a second oxidized gas; and introducing the second oxidized gas stream into a second heat recovery system wherein the second oxidized gas stream is cooled and heat is recovered therefrom. The cooled second oxidized gas comprises sulfur dioxide ($SO_2$) and may be further treated, for example, by introducing into a spent acid recovery plant for production of purified sulfuric acid, which may then be used in alkylation processes. Alternatively, the cooled second oxidized gas stream may be introduced into a sulfur recovery unit (SRU) for production of elemental sulfur.

Flow generally proceeds through the process due to pressure gradient. That is, pressure in the reducing furnace is higher than pressure in the oxidizing furnace. Preferably, the reducing furnace operates at a pressure slightly above or slightly below atmospheric pressure, for example −1 to 10 psig (−6.9 to 69 kPa gauge). Preferably the oxidizing furnace operates below atmospheric pressure.

In the first step of this invention, a first acid gas comprising hydrogen sulfide is introduced into a reducing furnace. While any acid gas comprising hydrogen sulfide may be used, conveniently and advantageously, the acid gas is an acid gas produced as a byproduct in a commercial operation, such as a refinery.

The first acid gas may be or comprise "solvent-treated acid gas". By "solvent-treated acid gas" it is meant a sour gas stream which has been treated by a regenerative absorption process in which hydrogen sulfide, carbon dioxide and/or other acid gases are absorbed into a non-volatile solvent. Solvents include salt solutions, such as potassium carbonate solution, and alkanolamines, such as monoethanolamine or diethanolamine, and any combination thereof. After absorption, the hydrogen sulfide, carbon dioxide, and/or other acid components, are released from the solvent by pressure reduction, thermal stripping or a combination of the two, to provide a treated gas, referred to herein as "solvent-treated acid gas". This particular acid gas typically comprises hydrogen sulfide, carbon dioxide and water as the major components, and may also comprise light hydrocarbons and nitrogen. Solvent-treated acid gas typically comprises about 60-85% $H_2S$, about 10-20% $CO_2$, with the balance comprising water, nitrogen, and hydrocarbons.

The first acid gas may be or comprise sour water stripper (SWS) gas. Refineries produce SWS gas from treating various "sour" water wash process streams which comprise hydrogen sulfide and ammonia. More specifically, SWS gas is generated when sour water is stripped with steam to remove hydrogen sulfide and ammonia. SWS gas and other acid gases have fuel value due to the presence of hydrogen sulfide, ammonia and light hydrocarbons. SWS gas typically comprises about equal amounts of ammonia, hydrogen sulfide and water.

Preferably the first acid gas is solvent-treated acid gas, SWS gas, or a combination thereof. More preferably, the selection of acid gas and the volume fed is based on the volumes of acid gases available, the volume of spent acid added to the oxidizing furnace; and the energy requirements to achieve the desired temperature. Thus, the treatment of sulfur-containing streams in a refinery can be improved, e.g., by minimizing energy (heat) loss and deriving value from sulfur-containing fuel sources, which have low value to refinery customers.

Use of acid gases such as solvent-treated acid gas and SWS gas is especially preferred when the process of this invention comprises treating spent acid from refining alkylation processes. These gases are readily available, thus they do not add costs to the plant and, after removal from more valuable hydrocarbon streams, they must also be treated to comply with government emission regulations.

Optionally, a first supplemental fuel can be added to the reducing furnace. The first supplemental fuel can be any gas having fuel value or other energy source. Conveniently, the preferred supplemental fuel is process gas. Process gas includes natural gas, refinery fuel gas, and acid gases comprising one or more of hydrogen sulfide, ammonia, and mercaptans. Preferably, the first acid gas provides sufficient energy to the process and no supplemental fuel is added to the reducing furnace.

The first oxygen-containing gas can be any oxygen-containing gas, such as, but not limited to air, oxygen-enriched air or oxygen. Preferably the first oxygen-containing gas is air or oxygen-enriched air. The amount of oxygen-containing gas introduced to the reducing furnace is less than the stoichiometric amount required for complete combustion. By "complete combustion" is meant herein oxidation of all of the sulfur-containing compounds to $SO_2$ and all of the carbon-containing compounds to $CO_2$. Typically, this amount is about 30-50% of the stoichiometric amount needed for complete combustion.

The reducing furnace and the oxidizing furnace, the latter of which is discussed herein below, comprise a burner and a chamber. Fuel, such as first acid gas and optional first supplemental fuel are mixed with oxygen-containing gas in the burner and introduced into the chamber as a flame, providing heat energy for reactions to occur within the furnace at the desired reaction temperature. This temperature is preferably above 1100° C., more preferably about 1250° C. to about 1350° C., for example, about 1250° C.

Certain acid gases, such as SWS gas, comprise both hydrogen sulfide and ammonia. At this temperature, under the reducing conditions provided by sub-stoichiometric oxygen in the reducing furnace, ammonia is converted to hydrogen ($H_2$) and nitrogen ($N_2$). Even though the temperature is favorable for $NO_x$ formation, in the presence of sub-stoichiometric oxygen, ammonia and nitrogen are not converted to $NO_x$. In contrast, when oxygen is present in greater than stoichiometric amount, $NO_x$ formation increases.

The reaction of acid gas and oxygen-containing gas in the reducing furnace produces a first oxidized gas stream. The first oxidized gas stream is a partially oxidized gas stream. That is, this stream comprises sulfur- and carbon-containing compounds, which can be converted, upon reaction with additional oxygen, to sulfur dioxide and carbon dioxide, respectively. For example, this stream also comprises hydrogen sulfide and other gases. Although reducing conditions are present in the reducing furnace, this stream may, and typically will comprise $SO_2$, due to oxidation of sulfur-containing compounds, and CO and $CO_2$, due to oxidation of carbon-containing compounds. This first oxidized gas stream may still further comprise one or more of elemental sulfur ($S_x$), water, carbonyl sulfide, carbon disulfide, and nitrogen.

The first oxidized gas stream is introduced into a first heat recovery system, which is referred to herein as an inter-stage heat recovery system. In the inter-stage heat recovery system, the gas stream is cooled and heat is recovered therefrom. The inter-stage heat recovery system may be any heat recovery system compatible with the gases and plant design. The inter-stage heat recovery system is preferably selected from the group consisting of a waste heat boiler or a process-to-process heat exchanger. For example, the inter-stage heat recovery system is a waste heat boiler when it is desirable to generate steam for other plant needs.

The inter-stage heat recovery system is typically a waste heat boiler, referred to herein as an inter-stage waste heat boiler IWHB. An IWHB generates steam between the reducing furnace and the oxidizing furnace and thereby increases heat recovery relative to a conventional process. Preferably an IWHB is integral to the reducing furnace but can be a separate unit.

The first oxidized gas stream is cooled in the first heat recovery system to a temperature above the temperature at which elemental sulfur, which may be present in the stream, would condense, that is, greater than 310° C. A typical temperature for the cooled gas stream is about 500° C.

The cooled first oxidized gas stream, a second oxygen-containing gas and optionally, one or more of (i) a second supplemental fuel, (ii) spent acid and (iii) water, are introduced into an oxidizing furnace comprising a burner and a chamber to produce a second oxidized gas stream. Preferably, at least one of (i) the second supplemental fuel, (ii) spent acid and (iii) water, are introduced into the oxidizing furnace. More preferably, the second supplemental fuel and spent acid are introduced into the oxidizing furnace. Water is added if temperature control is needed.

The second oxygen-containing gas can be the same as the first oxygen-containing gas, that is, any oxygen-containing gas, such as air, oxygen-enriched air or oxygen. Preferably the second oxygen-containing gas is the same as the first oxygen-containing gas and is air or oxygen-enriched air. The amount of oxygen in the oxygen-containing air fed to the oxidizing furnace is greater than the stoichiometric amount required for complete combustion. Sulfur-containing species and carbon-containing compounds present to be oxidized include $COS$, $CS_2$, $CO$ and $S_x$. Preferably, the greater than stoichiometric amount of oxygen is a slight excess of oxygen, for example, about 2.5 volume % excess (on a dry basis) for complete combustion.

The optional second supplemental fuel is preferably ammonia-free. Ammonia is converted to $NO_x$ under conditions in the oxidizing furnace. Preferably, a second supplemental fuel is added and this fuel is an ammonia-free second acid gas comprising hydrogen sulfide. More preferably the second acid gas is ammonia-free acid gas that is readily available to the process. Still more preferably, the second acid gas is solvent-treated acid gas, that is, acid gas produced from hydrogen sulfide-containing process gas streams in a refinery, as described hereinabove.

Spent acid is optionally introduced to the oxidizing furnace. The spent acid is typically introduced to the oxidizing furnace chamber as a spray, preferably multiple sprays, into the stream produced from the burner. Spent acid as used herein means a stream comprising sulfuric acid, which has become contaminated, e.g., with water and organic compounds, such as organic sulfates and hydrocarbons, during use, and that is subjected to acid recovery. Uses of sulfuric acid include, for example as a catalyst or reagent in petroleum refining and organic syntheses.

In petroleum refining, spent acid is a diluted acid stream that is purged from a sulfuric acid-catalyzed alkylation process, wherein light olefins are combined with isobutane in the presence of sulfuric acid to produce a product mixture suitable for use as motor vehicle fuel. The spent acid comprises about 90% sulfuric acid, between about 2% and about 7% organic sulfates ("acid soluble organics"), and the balance being water. Make-up fresh acid in the alkylation process typically comprises 99% sulfuric acid.

Spent acid may be produced from organic syntheses. Examples of such spent acid include "nitration spent acid" from nitration reactions, "methyl methacrylate waste acid" from methyl methacrylate production, or "caprolactam spent acid" from caprolactam production. Preferably the spent acid is an acid stream produced in a sulfuric acid-catalyzed alkylation process.

Spent acid is preferably introduced to the oxidizing furnace when the process of this invention is a combustion process which comprises introducing and treating the cooled oxidized gas stream from the oxidizing furnace to a spent acid recovery plant.

The second oxygen-containing gas and at least one of (1) at least a portion of the cooled first oxidized gas stream and (2) optional second supplemental fuel, are introduced into the burner of the oxidizing furnace to produce the energy necessary to achieve the desired reaction temperature. The amount of the cooled first oxidized gas stream introduced into the burner depends on several factors, including, temperature of the cooled first oxidized gas stream; volume of spent acid; concentration of acid in the spent acid; volume and fuel content (e.g., hydrogen sulfide, unoxidized carbon-containing compounds, such as $CO$, $COS$, $CS_2$ and process carbon-containing compounds) of both cooled first oxidized gas stream and optional second supplemental fuel; and the energy requirements to provide the desired temperature in the oxidizing furnace. All or a fraction of the cooled first oxidized gas stream may be introduced into the burner of the oxidizing furnace. Alternatively, when sufficient second supplemental fuel is introduced to the burner, the cooled stream may be introduced directly into the furnace chamber, that is, without passing through the burner.

Because of its lower temperature, the cooled first oxidized gas stream has a quenching effect, i.e., lowers the temperature of the flame, when introduced into the burner of the oxidizing furnace, which also reduces $NO_x$ formation. Therefore, it may be preferred to introduce at least a portion of the cooled first oxidized gas stream to the burner of the oxidizing furnace. Nonetheless, care must be taken to avoid introducing too much of the cooler stream into the burner as too much of the cooler stream will compromise the stability of the flame.

The second supplemental fuel, the cooled first oxidized gas stream, or a combination thereof, and second oxygen-containing gas are introduced to the burner of the oxidizing furnace to produce the energy necessary to achieve the desired reaction temperature. This temperature is preferably about 950° C. to about 1100° C., more preferably about 1000 to 1100° C., for example, about 1050° C. At this temperature, under the oxidizing conditions (greater than stoichiometric oxygen in the oxidizing furnace), complete combustion occurs. Temperature is preferably kept below 1100° C. to minimize $NO_x$ formation.

If necessary, water, as quench water, may be introduced to the oxidizing furnace to reduce temperature. The amount of quench water, if needed, is reduced significantly from that used in the absence of an inter-stage heat recovery system. Advantageously, the use of less quench water to control temperature results in less heat rejected, most of which is not recoverable, in a gas cleaning section of a spent acid recovery (SAR) plant. In addition, minimizing quench water required for temperature control also helps to reduce capital investment due to smaller size requirements of oxidizing furnace, downstream heat recovery systems, and gas cleaning sections of an SAR plant.

Acid gas, which may include second supplemental fuel, and optional spent acid are oxidized in the oxidizing furnace to produce a second oxidized gas stream. In the oxidizing furnace, sulfur-containing compounds, which may include hydrogen sulfide and sulfuric acid, are converted to $SO_2$. Small amounts of $SO_3$ are also produced. Sufficient oxygen is present to oxidize any elemental sulfur ($S_x$), which can plug downstream equipment, to $SO_2$. The second oxidized gas stream typically comprises $SO_2$, $SO_3$, water, $N_2$, $O_2$, $CO_2$ and particulates. Particulates enter the system as a component of the spent acid stream.

The present invention provides flexibility of fuel resources, e.g., in the oxidizing furnace, the use of cooled first oxidized gas stream and/or second supplemental fuel. The present invention further provides this flexibility in a way to improve efficient use of available fuel (first acid gas and supplemental fuels) and to minimize energy (heat) loss.

The second oxidized gas stream is introduced into a second heat recovery system to produce a cooled second oxidized gas stream. In the second heat recovery system, the gas stream is cooled and heat is recovered. The second heat recovery system may be the same or different from the first heat recovery system. That is, the second heat recovery system is preferably selected from the group consisting of a waste heat boiler or a process-to-process heat exchanger. The second heat recovery system is more preferably a waste heat boiler, referred to herein as the main waste heat boiler (MWHB).

The second oxidized gas stream is cooled in the second heat recovery system to a temperature suitable for further processing, e.g., in a spent acid recovery plant to produce sulfuric acid, or in a Claus plant to regenerate elemental sulfur. A typical temperature for this cooled gas stream is about 290-350° C.

A preferred combustion process in a spent acid recovery plant comprises cleaning the cooled stream from the second heat recovery system, for example, in a primary reverse jet scrubber, to remove particulates from the stream. The process further comprises removing water from the cleaned stream; e.g., by condensing water from the gas in a gas cooling tower. After removing condensed water, the gas stream may be fed to a second scrubber, e.g., a final reverse jet scrubber, to remove any remaining particulates. The gas stream is then dried, by contacting the gas stream with strong sulfuric acid in a drying tower. The dried gas comprises $SO_2$, $N_2$, $O_2$ and $CO_2$. Subsequently, $SO_2$ is oxidized to $SO_3$ in the presence of a catalyst and $SO_3$ is absorbed in a circulating stream typically comprising about 98-99% sulfuric acid.

Alternatively, the cooled second oxidized gas stream may be introduced to a sulfur recovery unit (SRU) for processing into elemental sulfur.

The present invention is described below in reference to the Figures.

Figure 1:
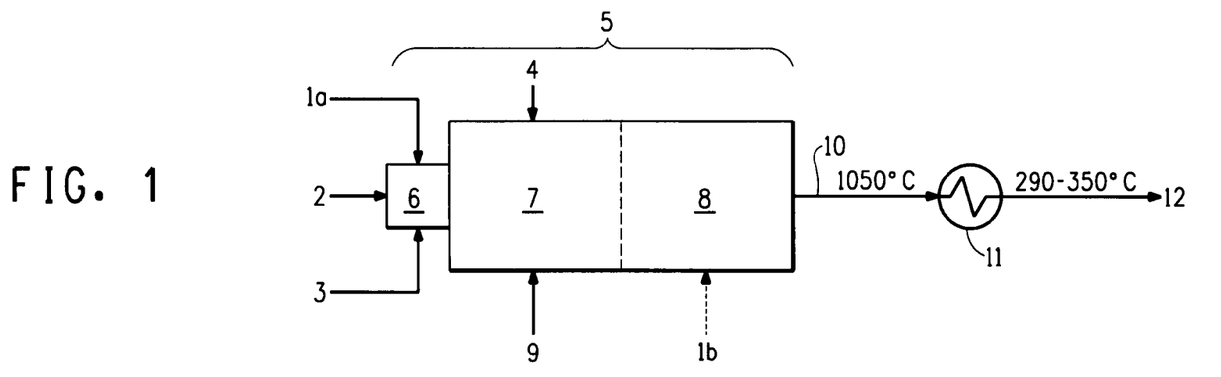
FIG. 1 is a process diagram of a conventional process for treating acid gas comprising hydrogen sulfide in a single stage furnace.

A conventional spent acid recovery (SAR) process utilizes a single stage furnace to decompose sulfuric acid as is shown in FIG. 1. In FIG. 1, first oxygen-containing gas 1a, solvent-treated acid gas 2 and sour water stripper (SWS) gas 3 are introduced to burner 6 of furnace 5 having reducing section 7 and connected to oxidizing section 8. Spent acid 4, which comprises sulfuric acid, is introduced to reducing section 7 of furnace 5. A second oxygen-containing gas 1b is introduced to oxidizing section 8 of furnace 5.

While a reducing section 7 and an oxidizing section 8 are illustrated as two separate sections in furnace 5, these operations may alternatively be combined into a single unit, having only one introduction of oxygen-containing gas. Still further, the "separation" between a reducing section and an oxidizing section may not be physical, e.g., may be merely a difference in oxygen concentration.

The amount of oxygen-containing gas 1a introduced to burner 6 is substoichiometric, that is, less than that required to fully oxidize the sulfur- and carbon-containing compounds present in the streams, typically about 90% by volume, dry basis, for conversion of sulfur-containing compounds to sulfur dioxide and carbon-containing compounds to carbon dioxide. Oxidizing section 8 of furnace 5 is operated under excess oxygen conditions. That is, the amount of oxygen-containing gas 1b added to oxidizing section 8 is greater than that required to fully oxidize the sulfur- and carbon-containing compounds, typically at least about 2.5% excess for conversion of sulfur-containing compounds to sulfur dioxide and carbon-containing compounds to carbon dioxide.

The temperature of furnace 5 is preferably between about 950° C. and about 1100° C. These temperatures are suitable for thermal decomposition of sulfuric acid to sulfur oxides under oxidizing (excess oxygen) conditions. Temperature is achieved by the energy produced from burning solvent-treated acid gas 2 and SWS gas 3, which each comprise hydrogen sulfide as a fuel source. If the energy exceeds the requirements for thermal decomposition of spent acid 5, temperature increases and quench water 9 is added to reducing section 7 to control temperature of furnace 5, to between about 950° C. and about 1100° C. Addition of quench water 9 is common in industry practice.

While conditions of temperature (between about 950° C. and 1100° C.) and excess oxygen are suitable for decomposition of sulfuric acid to sulfur oxides, these conditions are not preferred for conversion of ammonia to nitrogen and hydrogen. That is, when ammonia is present in one or more feeds to furnace 5, such as SWS gas 3, some of the ammonia is converted to nitrogen oxides ($NO_x$). In addition, especially at higher temperatures and excess oxygen, when oxygen-containing gases 1a and 1b comprise nitrogen (e.g., air or oxygen-enriched air), nitrogen may also be converted to $NO_x$.

Reaction of oxygen-containing gases with solvent-treated acid gas 2, SWS gas 3, and spent acid 4 in furnace 5 produces oxidized gas stream 10, which comprises sulfur oxides, $SO_2$ (predominant sulfur oxide) and $SO_3$ (typically present in small amounts). Stream 10 is introduced into heat recovery system 11, such as a waste heat boiler, conventionally referred to as the main waste heat boiler (MWHB), to recover heat from the process, producing cooled oxidized gas stream 12. Cooled stream 12 may be further processed according to known methods (not shown) for spent acid recovery which include, for example, cleaning the cooled oxidized gas stream 12 (to remove particulates), removing water from the cleaned stream, oxidizing $SO_2$ to $SO_3$, and absorbing $SO_3$ in a circulating stream typically comprising 98-99% sulfuric acid.

Notable disadvantages of the conventional process illustrated in FIG. 1 include the following. The addition of quench water 9 increases volume of the oxidized gas stream, which must be treated downstream. Due to increased volume of the stream, sizes of the combustion furnace 5, and downstream equipment, such as heat recovery systems, and gas cleaning equipment (not shown), must be increased, which in turn, increase costs. Since oxidized gas stream 10 is cooled in heat recovery system 11 (MWHB) to between about 290° C. to about 350° C., all of the latent heat and part of the sensible heat of the steam generated from quench water 9 in furnace 5 is lost.

Therefore, a conventional furnace 5 for a spent acid recovery (SAR) process, as illustrated in FIG. 1 having reducing section 7 and oxidizing section 8, has deficiencies that include a need for quench water 9, increased equipment size, wasted heat and excessive $NO_x$ formation.

The process of the present invention mitigates the above deficiencies. A preferred embodiment of the process of this invention as illustrated in FIG. 2 comprises introducing an acid gas stream sequentially through a reducing furnace 24 and an oxidizing furnace 30 separated by an inter-stage heat recovery system 28.

Figure 2:
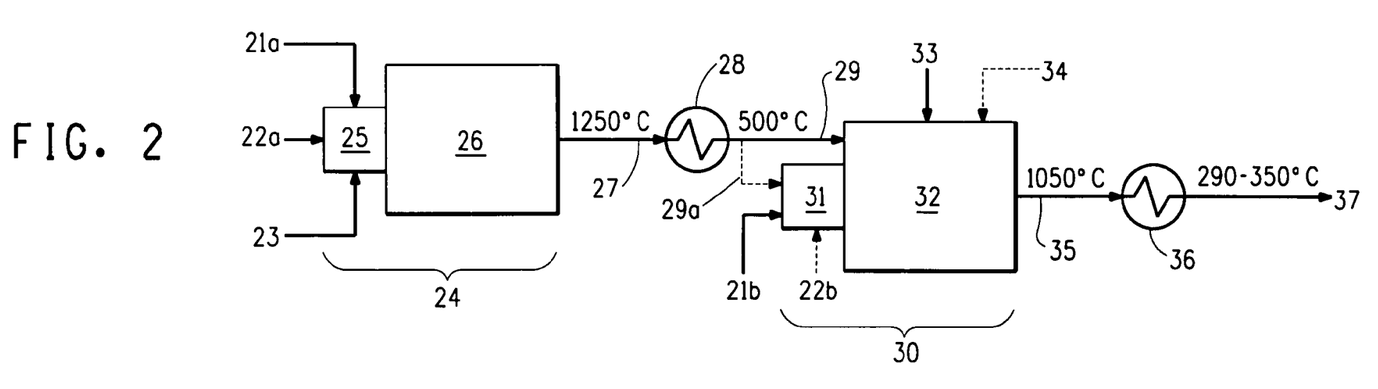
FIG. 2 is a process diagram of a process of this invention for treating acid gas comprising hydrogen sulfide in a staged furnace with inter-stage heat recovery.

In the process illustrated in FIG. 2, a first acid gas, comprising solvent-treated acid gas 22a (first solvent treated acid gas) and sour water stripper (SWS) gas 23, and first oxygen-containing gas 21a are introduced into burner 25 of reducing furnace 24, which has combustion chamber 26. Ammonia in the SWS gas 23 is reduced to nitrogen and hydrogen in reducing furnace 24.

Exiting reducing furnace 24 is first oxidized gas stream 27, which comprises $H_2S$, $SO_2$, $S_x$, $H_2O$, $H_2$, CO, $CO_2$, COS, $CS_2$, $N_2$, at a temperature of about 1250° C. First oxidized gas stream 27 is introduced into first heat recovery system 28, which is an inter-stage waste heat boiler (IWHB). As illustrated, heat recovery system 28 is a separate unit from reducing furnace 24. Cooled first oxidized gas stream 29 exits heat recovery system 28 at a temperature of about 500° C.

Cooled first oxidized gas stream 29 is introduced into oxidizing furnace chamber 32 of oxidizing furnace 30. A portion of cooled first oxidized gas stream 29a is introduced to burner 31 of oxidizing furnace 30 along with second oxygen-containing gas 21b and second supplemental fuel which is a second acid gas, more specifically a second solvent-treated acid gas 22b. No SWS gas, which comprises ammonia, is introduced into oxidizing furnace 30. Spent acid 33 is introduced into oxidizing furnace chamber 32 of oxidizing furnace 30. In addition, quench water 34, is available to add if needed, to reduce temperature in oxidizing furnace chamber 32.

In oxidizing furnace 30, reaction of oxygen with cooled first oxidized gas stream 29, spent acid 33 and second supplemental fuel 22b, which is a second solvent-treated acid gas, produce second oxidized gas stream 35. Second oxidized gas stream 35 comprises $SO_2$, $SO_3$, water, $N_2$, $O_2$, and $CO_2$. Stream 35 exits oxidizing furnace 30 at a temperature of about 1050° C.

Second oxidized gas stream 35 is introduced into second heat recovery system 36, to recover heat from the process, producing cooled second oxidized gas stream 37. Second heat recovery system 36 is a waste heat boiler (WHB), similar to the main waste heat boiler (MWHB), per FIG. 1, heat recovery system 11, and may be also referred to as MWHB in FIG. 2. Cooled stream 37 exits second heat recovery system 36 at a temperature of about 290-350° C. Cooled stream 37 may be further processed according to known methods (not shown) for spent acid recovery which include, for example, cleaning the cooled stream 37 (to remove particulates), removing water from the cleaned stream, oxidizing $SO_2$ to $SO_3$, and absorbing $SO_3$ in a circulating stream typically comprising 98-99% sulfuric acid.

In comparison to existing technology for treating acid gas, the process of the present invention minimizes $NO_x$ generation by converting ammonia in refinery sour water stripper gas to nitrogen and hydrogen in a reducing furnace separated from an oxidizing furnace by an inter-stage heat recovery system. The reducing furnace operates under highly reducing conditions and at a temperature to minimize fuel and thermal $NO_x$ compared to the conventional processes, in which ammonia is exposed to excess oxygen.

Heat recovery using a first heat recovery system in the process of this invention allows excess heat to be recovered, for example, as valuable steam when a waste heat boiler is used or for use in other processes, and, at the same time helps minimize the quench water requirement, which is used for temperature control in the oxidizing furnace. Use of less water to control temperature results in less heat rejected, which is not recoverable. Additionally, minimizing quench water helps reduce capital investment related to size of the oxidizing furnace, second heat recovery system and other downstream equipment by reducing volumetric gas flow.

EXAMPLES

Example 1 and Comparative Example A

The processes shown in FIGS. 1 and 2 were simulated in Comparative Example A (an embodiment of the process of the prior art) and Example 1 (an embodiment of the process of the present invention), respectively, using ASPEN PLUS (from Aspen Technology, Inc., Cambridge Mass.). ASPEN PLUS simulation software is used to evaluate engineering concepts. Table 1 shows the feed components and their compositions, temperatures, and flow rates used in the computer simulation. The feed compositions are within the range of typical compositions which may be available in a refinery. In all simulations, air was used as first and second oxygen-containing gases. All feed pressures were 10 psig (24.7 psia, 170 kPa).

TABLE 1

| Feed Component | Feed Temp. | Flow rate Comp. Ex. A | Flow rate Example 1 | Feed Composition |
|---|---|---|---|---|
| Spent Acid | 72° F. (22° C.) | 25000 lb/h (11340 kg/h) | 25000 lb/h (11340 kg/h) | 90% $H_2SO_4$, 3% $H_2O$, 7% Organic (weight %) |
| First Solvent-Treated Acid Gas | 120° F. (49° C.) | 764 lb mol/h (345 kg mol/h) | 756 lb mol/h (343 kg mol/h) | 82% $H_2S$, 12% $CO_2$, 6% $H_2O$ (mole %) |
| Second Solvent-Treated Acid Gas | 120° F. (49° C.) | 0 | 8 lb mol/h (3.6 kg mol/h) | 82% $H_2S$, 12% $CO_2$, 6% $H_2O$ (mole %) |
| SWS Gas | 185° F. (89° C.) | 88 lb mol/h (40 kg mol/h) | 88 lb mol/h (40 kg mol/h) | 33.4% $H_2S$, 33.3% $NH_3$, 33.3% $H_2O$ (mole %) |
| First $O_2$-Containing Gas | 95° F. (35° C.) | 6240 lb mol/h (2830 kg mol/h) | 1922 lb mol/h (872 kg mol/h) | 77.0% $N_2$, 20.5% $O_2$, 2.5% $H_2O$ (mole %) |
| Second $O_2$-Containing Gas | 95° F. (35° C.) | 0 | 4320 lb mol/h (1960 kg mol/h) | 77.0% $N_2$, 20.5% $O_2$, 2.5% $H_2O$ (mole %) |

In simulated Comparative Example A, first acid gas 2, which is solvent-treated acid gas, SWS gas 3, and first oxygen-containing gas 1a, which is air, were fed to burner 6 of reducing section 7 of furnace 5. Spent acid 4 was introduced into reducing section 7 of furnace 5. Quench water 9 was introduced into reducing section 7 of furnace 5 to control temperature at <1100° C. Oxidized gas stream 10 exited furnace 5 and was introduced into heat recovery system 11, to recover heat.

In simulated Example 1, first acid gas 22a, which is solvent-treated acid gas, SWS gas 23 and first oxygen-containing gas 21a, which is air, were fed to burner 25 of reducing furnace 24. Stream 27 exiting reducing furnace 24 was fed to a first heat recovery system 28, to cool the stream and recovery heat. The cooled stream 29, second acid gas 22b (supplemental fuel, which is solvent-treated acid gas), and second oxygen-containing gas 21b, which is air, were fed to burner 31 of oxidizing furnace 30. Spent acid 33 was fed into chamber 32 of oxidizing furnace 30. Quench water 34 was fed to oxidizing forest to control temperature to less than 1100° C. Oxidized gas stream 35 exited furnace and also introduce into second heat recovery system 36, to recover heat.

ASPEN PLUS simulation was used to calculate (1) the quench water requirement, (2) the heat recovered from individual and combined heat recovery systems, and (3) the gas mole flow exiting the oxidizing section or oxidizing furnace for Comparative Example A and for Example 1. The calculations based on the simulation are provided in Table 2.

The first heat recovery system 28 of Example 1, is an inter-stage waste heat boiler (IWHB) and the heat recovered is referred to in Table 2 as IWHB Heat Recovery. The heat recovery system 11 of Comparative Example A and the second heat recovery system 36 of Example 1 are main waste heat boilers (MWHBs) and the heat recovered for each Example is referred to in Table 2 as MWHB Heat Recovery. Total Heat Recovery is the sum of IWHB and MWHB heat recoveries. The gas mole flow exiting the oxidizing section 8 (Comparative Example A) is oxidized gas stream 10. The gas mole flow exiting the oxidizing furnace 30 (Example 1) is second oxidized gas stream 35. The gas mole flow exiting the oxidizing section 8 and the oxidizing furnace 30 are referred to in Table 2 as "Oxidized gas stream flow".

TABLE 2

| Flow Rates and Heat Recoveries | Comparative Ex. A | Ex. 1 |
| --- | --- | --- |
| Quench Water flow, gal/min. (L/min) | 35 (131) | <1 (<3.8) |
| IWHB Heat Recovery, $10^6$ btu/h (MW) | Not applicable | 34 (10) |
| MWHB Heat Recovery, $10^6$ btu/h (MW) | 97 (28) | 85 (25) |
| Total Heat Recovery, $10^6$ btu/h (MW) | 97 (28) | 119 (35) |
| Oxidizing furnace exit gas flow, lb mol/h (kg mol/h) | 8332 (3779) | 7375 (3345) |

Table 2 shows Comparative Example A (process using conventional furnace of the prior art), 35 gal/min. (131 L/min.) of quench water is needed to maintain the temperature of the furnace less than 1100° C. In contrast, temperature can be maintained in Example 1 (process of this invention with two stage furnace and inter-stage cooling) at less than 1 gal/min. (<3.8 L/min.). While input fuel feeds for Comparative Example A and Example 1 are the same, the mole flow rate exiting the oxidizing furnace in Example 1 is less since less quench water has been added to Example 1.

Example 1 also provides higher heat recovery from the heat recovery systems and lower oxidizing furnace exit flows compared to Comparative Example A.

Examples 2 and 3 and Comparative Example B

Examples 2 and 3 are simulated alternative embodiments of the process of this invention. Comparative Example B is a simulated alternative embodiment of the process of the prior art. ASPEN PLUS was used in these Examples to simulate process for feeding only acid gas, meaning no spent acid was fed to the oxidizing furnace. Table 3 shows the feed components and their compositions, temperatures and flow rates used in the computer simulations. The feed compositions used are within the range of typical compositions for the listed feeds. The acid gas feed comprised solvent-treated acid gas and sour water stripper (SWS) gas in a ratio of about 61% solvent-treated acid gas and 39% SWS gas. In these simulations, air was used as first and second oxygen-containing gases. All feed pressures were 10 psig (170 kPa).

TABLE 3

| Acid Gas Feed Component | Feed Temp. | Flow Rate | Composition (mol %) |
| --- | --- | --- | --- |
| Solvent-treated acid gas | 145° F. (63° C.) | 394 lb mol/h (179 kg mol/h) | 66% $H_2S$, 11% $CO_2$, 12% $H_2O$, 10% $N_2$. Balance: light HCs*. |
| SWS gas | 190° F. (88° C.) | 249 lb mol/hr (113 kg mol/h) | 27% $H_2S$, 34% $NH_3$, 33% $H_2O$. Balance: $N_2$, $CO_2$ and light HCs*. |

*HCs: Hydrocarbons.

In simulated Comparative Example B, 100% of the total solvent-treated acid gas, 100% of the total SWS gas and 100% of the total oxygen-containing gas were fed to burner of reducing section of furnace. Quench water was introduced into reducing section of furnace to control temperature at <1100° C. Oxidized gas stream exited furnace and was introduced into heat recovery system, to recover heat.

In simulated Examples 2, 25% of the total solvent-treated acid gas, 100% of the total SWS gas, and 17% of the total oxygen-containing gas were fed to burner of the reducing furnace. In Example 2, 75% of total solvent-treated acid gas and 83% of the total oxygen-containing gas were fed to the oxidizing furnace. In Example 3, 90% of the total solvent-treated acid gas, 100% of the total SWS gas and 32% of the total oxygen-containing gas were fed to the reducing furnace. In Example 3, 10% of the total solvent-treated acid gas and 68% of the total oxygen-containing gas were fed to the oxidizing furnace.

The stream exiting reducing furnace was fed to a first heat recovery system, to cool the stream and recover heat. The cooled stream, second acid gas, the balance of total acid gas (supplemental fuel), and second oxygen-containing gas, were fed to burner of oxidizing furnace. Quench water was fed to oxidizing forest to control temperature to less than 1100° C. Oxidized gas stream exited furnace and also was introduced into second heat recovery system, to recover heat.

Simulations for treating the streams after heat recovery for Comparative Example B and after second heat recovery for Examples 2 and 3 were the same. The cooled streams from heat recovery were fed to a gas cleaning portion of a spent acid recovery (SAR) unit as "SAR gas stream". Each SAR gas stream was cleaned and further cooled, leaving the gas cleaning system saturated with water vapor at a temperature of about 35-40° C. Heat was rejected from the gas cooling system by counter-current heat exchanger, Weak Acid Cooler.

ASPEN PLUS simulation was used to calculate (1) the quench water requirement, (2) the heat recovered from individual and combined heat recovery systems, (3) the gas mole flow exiting the oxidizing section or oxidizing furnace for Comparative Example B and for Examples 2 and 3; and (4) heat rejected in the weak acid cooler. The calculations based on the simulation are provided in Table 4.

The first heat recovery system of Examples 2 and 3 is an inter-stage waste heat boiler (IWHB) and the heat recovered is referred to in Table 4 as IWHB Heat Recovery. The heat recovery system of Comparative Example B and the second heat recovery system of Examples 2 and 3 are main waste heat boilers (MWHBs) and the heat recovered for each Example is referred to in Table 4 as MWHB Heat Recovery. Total Heat Recovery is the sum of IWHB and MWHB heat recoveries.

The gas mole flow exiting the oxidizing section (Comparative Example B) is oxidized gas stream. The gas mole flow exiting the oxidizing furnace (Examples 2 and 3) is second oxidized gas stream. The gas mole flow exiting the oxidizing section and the oxidizing furnace are referred to in Table 4 as "Oxidized gas stream flow".

TABLE 4

| Flow Rates and Heat Recoveries | Comparative Ex. B | Ex. 2 | Ex. 3 |
|---|---|---|---|
| SWS Gas to Reducing Furnace | N/A | 100% | 100% |
| Fraction of Solvent-Treated Acid Gas to Reducing Furnace | N/A | 25% | 90% |
| Total Oxygen-Containing Gas, lb mol/h (kg mol/h) | 3550 (1610) | 3550 (1610) | 3550 (1610) |
| Oxygen-Containing Gas split (%) between Reducing/Oxidizing Furnace | 100% to Furnace | 17%/83% | 32%/68% |
| Quench Water Flow, gal/min. (L/min.) | 31 (117) | 15 (57) | 3 (11) |
| IWHB Heat Recovery, $10^6$ Btu/h (MW) | N/A | 15 (4.4) | 27 (7.9) |
| MWHB Heat Recovery, $10^6$ Btu/h (MW) | 61 (17.9) | 54 (15.8) | 49 (14.4) |
| Total Heat Recovery, $10^6$ Btu/h (MW) | 61 (17.9) | 69 (20.2) | 76 (22.3) |
| Oxidized gas stream flow, lb mol/h (kg mol/h) | 4875 (2211) | 4425 (2007) | 4092 (1199) |
| Weak Acid Coolers, $10^6$ Btu/h (MW) | 39 (11.4) | 31 (9.1) | 24 (7.0) |

Table 4 shows that for Comparative Example B (process using conventional furnace of the prior art), where 100% of the total solvent-treated acid gas, 100% of the total SWS gas and 100% of the total oxygen-containing gas were fed to the burner in the reducing section of the furnace. In simulated Comparative Example B, 31 gal/min. (117 L/min.) of quench water flow is needed to maintain the temperature of the furnace 5 at <1100° C. In contrast, Examples 2 and 3 (furnace arrangement of the present invention) require less than half this amount (15 gal/min., 57 L/min.) when 25% of the acid gas feed is fed to the reducing furnace. Furthermore, the flow of quench water is further reduced to less than one tenth as much (3 gal/min., 11 L/min.) in Example 3 when 90% of the acid gas feed is fed to the reducing furnace. Total Heat Recovery is increased in both Examples 2 and 3, particularly in Example 3. The mole flow of oxidized gas stream for Example 2 is reduced since less quench water has been added relative to Comparative Example B when the same amount of fuel is fed. In Example 3, the mole flow of oxidized gas stream is reduced further at the same feed rate of fuel due to a larger reduction in quench water used relative to Comparative Example B.

What is claimed is:

1. A process for treating an acid gas comprising hydrogen sulfide which comprises:
   (a) introducing a first acid gas, which comprises hydrogen sulfide and a first oxygen-containing gas into a reducing furnace producing a first oxidized gas stream, wherein the temperature of the reducing furnace is in the range of 1100° C. to 1350° C., and wherein the amount of oxygen-containing gas in the reducing furnace is about 30-50% of the stoichiometric amount for oxidation of all of the sulfur-containing compounds to $SO_2$ and all of the carbon-containing compounds to $CO_2$;
   (b) introducing the first oxidized gas stream into a first heat recovery system wherein the stream is cooled and heat is recovered therefrom;
   (c) introducing the cooled first oxidized gas stream and a second oxygen-containing gas, into an oxidizing furnace, which comprises a burner and a chamber, producing a second oxidized gas stream, wherein the temperature of the oxidizing furnace is in the range of 950° C. to 1100° C. and wherein the amount of oxygen in the second oxygen-containing gas is greater than the stoichiometric amount required for complete combustion; and
   (d) introducing the second oxidized gas stream into a second heat recovery system; wherein the second oxidized gas stream is cooled and heat is recovered therefrom.

2. The process of claim 1 wherein one or more of (i) a second supplemental fuel; (ii) spent acid, which comprises sulfuric acid, and (iii) water are introduced into the oxidizing furnace in step (c).

3. The process of claim 2 wherein the spent acid is a dilute acid stream produced in a sulfuric acid alkylation process, nitration spent acid, methyl methacrylate waste acid, or caprolactam spent acid.

4. The process of claim 3 wherein the spent acid is a dilute acid stream produced in a sulfuric acid alkylation process.

5. The process of claim 2 further comprising in step (c) introducing quench water into the oxidizing furnace.

6. The process of claim 1 wherein step (c) further comprises introducing spent acid into the oxidizing furnace.

7. The process of claim 3 further comprising treating the cooled second oxidized gas stream in a spent acid recovery plant to produce sulfuric acid.

8. The process of claim 1 wherein the acid gas is solvent-treated acid gas, sour water stripper gas, or a combination thereof.

9. The process of claim 1 wherein a first supplemental fuel is introduced into the reducing furnace in step (a).

10. The process of claim 1 wherein a second supplemental fuel is introduced into the oxidizing furnace in step (c).

11. The process of claim 10 wherein the second supplemental fuel is an ammonia-free acid gas.

12. The process of claim 1 wherein each of the first heat recovery system and the second heat recovery system is a waste heat boiler or a process-to-process heat exchanger.

13. The process of claim 12 wherein each of the first heat recovery system and the second heat recovery system is a waste heat boiler.

14. The process of claim 1 wherein a portion of the cooled first oxidized gas stream is introduced into the burner of the oxidizing furnace.

15. A combustion process in a spent acid recovery plant comprising:
   (a) introducing a first acid gas and a first oxygen-containing gas, into a reducing furnace producing a first oxidized gas stream, wherein the temperature of the reducing furnace is in the range of 1100° C. to 1350° C., and wherein the amount of first oxygen-containing gas in the reducing furnace is about 30-50% of the stoichiometric amount for oxidation of all of the sulfur-containing compounds to $SO_2$ and all of the carbon-containing compounds to $CO_2$;
   (b) introducing the first oxidized gas stream into a first heat recovery system wherein the first oxidized gas stream is cooled and heat is recovered therefrom;
   (c) introducing the cooled first oxidized gas stream, a second oxygen-containing gas, and spent acid comprising sulfuric acid, into an oxidizing furnace, which comprises a burner and a chamber, producing a second oxidized gas stream, wherein the temperature of the oxidizing furnace is in the range of 950° C. to 1100° C. and wherein the amount of oxygen in the second oxygen-containing gas is greater than the stoichiometric amount required for complete combustion;
   (d) introducing the second oxidized gas stream into a second heat recovery system; wherein the second oxidized gas stream is cooled and heat is recovered therefrom; and
   (e) treating the cooled second oxidized gas stream in a spent acid recovery plant to produce sulfuric acid.

16. The process of claim 15 wherein one or both of (i) a second supplemental fuel and (ii) water, are introduced into the oxidizing furnace in step (c).

17. The process of claim 16 wherein the first acid gas comprises solvent-treated gas and sour water stripper gas.

18. The process of claim 16 wherein a supplemental fuel is introduced into the oxidizing furnace in step (c).

19. The process of claim 18 wherein the supplemental fuel is an ammonia-free acid gas.

20. The process of claim 16 wherein the spent acid is a dilute acid stream produced in a sulfuric acid alkylation process.

21. The process of claim 20 further comprising treating the cooled second oxidized gas stream in a spent acid recovery plant to produce sulfuric acid.

* * * * *

UNITED STATES PATENT AND TRADEMARK OFFICE
CERTIFICATE OF CORRECTION

| | | |
|---|---|---|
| PATENT NO. | : 7,695,701 B2 | Page 1 of 1 |
| APPLICATION NO. | : 12/074988 | |
| DATED | : April 13, 2010 | |
| INVENTOR(S) | : Zeru Berhane Tekie, Luis Alberto Chu and Eugene F. Hartstein | |

It is certified that error appears in the above-identified patent and that said Letters Patent is hereby corrected as shown below:

On title page, item (73), please add the following:

-- Assignee: E. I. du Pont de Nemours and Company
                Wilmington, Delaware USA --

Signed and Sealed this

Fourth Day of January, 2011

David J. Kappos
*Director of the United States Patent and Trademark Office*